US012677366B1

(12) United States Patent
Xu et al.

(10) Patent No.: US 12,677,366 B1
(45) Date of Patent: Jul. 7, 2026

(54) LINKAGE CONTROL METHOD AND SYSTEM FOR TV VIEWING AMBIENT LIGHT STRIPS

(71) Applicant: Shenzhen Uascent Technology Co., Ltd, Shenzhen (CN)

(72) Inventors: Ming Xu, Shenzhen (CN); Xuan Yi, Shenzhen (CN); Weipeng Huang, Shenzhen (CN); Lin Tang, Shenzhen (CN); Kaihua Wu, Shenzhen (CN); Bin Sun, Shenzhen (CN); Xinran Tang, Shenzhen (CN)

(73) Assignee: Shenzhen Uascent Technology Co., Ltd, Shenzhen (CN)

( * ) Notice: Subject to any disclaimer, the term of this patent is extended or adjusted under 35 U.S.C. 154(b) by 0 days.

(21) Appl. No.: 19/393,469

(22) Filed: Nov. 18, 2025

(30) Foreign Application Priority Data

Sep. 22, 2025 (CN) ........................ 202511357068.X

(51) Int. Cl.
*H05B 47/105* (2020.01)

(52) U.S. Cl.
CPC .................................. *H05B 47/105* (2020.01)

(58) Field of Classification Search
CPC .................. H05B 47/11; H05B 47/105; H05B 47/115–125; H05B 47/155
See application file for complete search history.

(56) References Cited

U.S. PATENT DOCUMENTS 12,267,933 B1 * 4/2025 Zhu ...................... H05B 47/165
2025/0301547 A1 * 9/2025 Younessian ............ G06V 10/56

FOREIGN PATENT DOCUMENTS

CN 115297594 A * 11/2022 ............. H05B 47/19
WO WO-2021249938 A1 * 12/2021 ......... H05B 47/1965

* cited by examiner

*Primary Examiner* — Alexander H Taningco
*Assistant Examiner* — Pedro C Fernandez

(57) ABSTRACT

The present application discloses a linkage control method and system for TV viewing ambient light strips, relating to the technical field of light strip control. The method includes: installing a controller above a TV set and acquiring color data; establishing an initial color control method to control the color of the light strip; acquiring linkage analysis light strips and obtaining common points; controlling the color of the light strip via the controller when the TV set is started, based on the common points and the initial color control method. The present application solves the problems of existing methods for linkage control of TV viewing ambient light strips: inability to perform real-time control of the light strip's light based on TV images during viewing, resulting in the light strip's light not matching the viewing content, causing a sense of disconnection in the user's visual experience and reduced viewing immersion.

10 Claims, 5 Drawing Sheets

LINKAGE CONTROL METHOD AND SYSTEM FOR TV VIEWING AMBIENT LIGHT STRIPS

RELATED APPLICATIONS

The present application claims the benefit of priority of Chinese Patent Application No. 202511357068.X, filed Sep. 22, 2025, and entitled "LINKAGE CONTROL METHOD AND SYSTEM FOR TV VIEWING AMBIENT LIGHT STRIPS," the entire content of which is incorporated herein by reference.

TECHNICAL FIELD

The present application relates to the technical field of light strip control, and specifically relates to a linkage control method and system for TV viewing ambient light strips.

BACKGROUND

A TV viewing ambient light strip is an auxiliary device that displays colors synchronously with TV images through an LED light strip, and is mainly configured to enhance the home viewing experience. Its core function is to create an immersive visual effect through the synchronous color changes of light and images. The light strip linkage control method mainly includes intelligent controller linkage, inductive switch linkage, contactor-assisted control, and scenario automation setting.

Existing methods for linkage control of TV viewing ambient light strips usually involve pre-setting the colors displayed by the lamp beads in the light strip to obtain light strip control methods corresponding to multiple light strip dimming modes, so as to realize the control of the light strip based on the demand for ambient lights in different environments. Although this improved method can simplify the light strip control process and improve the light strip control efficiency, it can only control through the preset dimming mode and cannot realize real-time control of the light strip's light based on the images in the TV during user viewing. As a result, the light emitted by the light strip cannot match the viewing content, causing a sense of disconnection in the images seen by the user and affecting the user's sense of immersion when using the light strip. For example, the patent application with publication number CN113709933A discloses an LED light strip lighting control method and an LED light strip controller. This solution matches the corresponding target LED light strip dimming mode from the multiple LED light strip dimming modes according to the lighting type of the target LED light strip, simplifying the lighting control of multiple LED light strips and improving the efficiency of such control. However, other improvements to the linkage control methods for TV viewing ambient light strips are usually focused on adjusting light intensity, and still fail to solve the problem that real-time control of the light strip's light based on TV images during viewing is not possible, resulting in the light source emitted by the light strip not matching the viewing content, a sense of disconnection in the user's visual experience, and reduced viewing immersion when using the light strip. In view of this, it is necessary to improve the existing linkage control methods for TV viewing ambient light strips.

SUMMARY

The present application aims to solve one of the technical problems in the prior art at least to a certain extent. By proposing a linkage control method and system for TV viewing ambient light strips, it is configured to solve the problem that the existing linkage control method for TV viewing ambient light strips relies on a preset dimming mode, and cannot control the light of the light strip in real time based on the image in the TV during user viewing, resulting in the light source emitted by the light strip not matching the viewing content, a sense of disconnection in the user's visual experience, and reduced viewing immersion when using the light strip.

To achieve the preceding objective, in a first aspect, the present application provides a linkage control method for TV viewing ambient light strips, including the following steps:

Install a controller above the TV set, and use the controller to acquire the color data of images displayed on the TV set (the controller includes a light strip controller, a photosensitive resistor, and a color sensor); acquire the dimensional data of the TV set and the positional relationship between the light strip and the TV set (the dimensional data of the TV set includes length, width, and height of each part of the TV set);

Establish an initial color control method based on the dimensional data of the TV set and the color data of images displayed on the TV set acquired by the controller, and use the initial color control method to control the color of the light strip via the light strip controller;

Acquire multiple controlled light strips obtained by the initial color control method based on multiple images displayed on the TV set, and record them as linkage analysis light strips respectively; perform feature extraction on the control data of the linkage analysis light strips, and obtain multiple common points in the color comparison chart of the initial color control method based on the feature extraction results; and control the color of the light strips via the controller when the TV set is started, based on the common points and the initial color control method.

Further, installing the controller above the TV set and using the controller to acquire the color data of images displayed on the TV set includes:

The color sensor is configured to collect the color of images displayed on the TV set, and the obtained data corresponding to the color distribution is recorded as color data of images displayed on the TV set. The photosensitive resistor is configured to monitor the ambient light intensity where the TV set is located in real time, and when the ambient light intensity is lower than Ω, the light strip controller is powered on.

Further, establishing the initial color control method based on the dimensional data of the TV set and the color data of images displayed on the TV set acquired by the controller includes:

Establish a plane rectangular coordinate system, denoted as the light control analysis coordinate system, where the units of both the X-axis and Y-axis of the light control analysis coordinate system are m; place the front view of the TV set in the first quadrant of the light control analysis coordinate system in equal proportion based on the dimensional data of the TV set, and record it as the TV block diagram; and Mark the position of the light strip in the light control analysis coordinate system based on the positional relationship between the light strip and the TV set and the proportion of the TV set in the light control analysis coordinate system, and record it as the marked light strip.

Further, reduce the ambient light intensity where the TV set is located to less than Ω, randomly display an image on the TV set, acquire the color data of images displayed on the TV set at this time, and establish the initial color control method. The initial color control method includes:

Draw a color map corresponding to the image in the TV set within the TV block diagram based on the color data of images displayed on the TV set, and record it as the color block analysis diagram; for any lamp bead in the light strip: acquire the position corresponding to the lamp bead in the marked light strip, and record it as the marked point; acquire the point in the color block analysis diagram that is closest to the marked point, and record it as the color association point;

Acquire a full-color RGB comparison chart with white at the bottom-left corner and black at the top-right corner, and record it as the color comparison chart; acquire the point in the full-color RGB comparison chart that has the same RGB value as the color association point based on the RGB value of the color association point, and record it as the color chart response point; and record the line connecting the color chart response point and the bottom-left corner of the color comparison chart as the color gradient line.

Further, the initial color control method also includes:

Record the center point of the TV block diagram as the TV center point; record the distance between the TV center point and the color association point as L1, and the distance between the color association point and the marked point as L2; record the value of L2 divided by L1 as the distance ratio; when the distance ratio is less than or equal to 1, perform low-spacing filling; and when the distance ratio is greater than 1, perform high-spacing filling.

Low-spacing filling includes: dividing the color gradient line into k equal parts in proportion, and recording the midpoint of each part as a filling selection point, where k is the number of seconds of the color switching interval of the light strip; recording the color of each filling selection point in the color comparison chart as the filling color corresponding to the filling selection point;

Recording all filling selection points in sequence as filling selection points $TX_1$ to $TX_k$ based on their distance from the color chart response point from the nearest to the farthest; and within k seconds, adjusting the color of the lamp bead corresponding to the marked point to the filling colors of filling selection points $TX_1$ to $TX_k$ in sequence, and cycling repeatedly when the image on the TV set does not switch.

Further, high-spacing filling includes:

Acquiring all points in the color comparison chart that correspond to colors overlapping with the color gradient line, and recording them all as high-filling points; recording the color of each high-filling point as the high-filling color corresponding to the high-filling point;

Recording all high-filling points in sequence as high-filling points $GT_1$ to $GT_j$ based on their distance from the color chart response point from the nearest to the farthest; within k seconds, adjusting the color of the lamp bead corresponding to the marked point to the high-filling colors of high-filling points $GT_1$ to $GT_j$ in sequence, and cycling repeatedly when the image on the TV set does not switch.

Further, the initial color control method also includes:

Acquire the low-spacing filling or high-spacing filling corresponding to all lamp beads in the light strip, and control the color of each lamp bead based on the low-spacing filling or high-spacing filling corresponding to the lamp bead. Note that the color comparison chart for all lamp beads is the same.

Further, performing feature extraction on the control data of the linkage analysis light strips includes:

Record the number of acquired linkage analysis light strips as t; draw the color gradient lines corresponding to all lamp beads of all linkage analysis light strips in the same color block analysis diagram based on the control data of the linkage analysis light strips, and acquire gradient key points in the color block analysis diagram (a gradient key point is an intersection point of t or more color gradient lines in the color block analysis diagram);

For any lamp bead in the light strip: mark the high-filling points and filling selection points in the high-spacing filling or low-spacing filling corresponding to the lamp bead in the control data of all linkage analysis light strips within the same color block analysis diagram; if there is any point A marked as both a high-filling point and a filling selection point, record point A as a lamp bead key point; and Acquire the lamp bead key points corresponding to all lamp beads, and record the lamp bead key points and gradient key points as common points.

Further, controlling the color of the light strip via the controller when the TV set is started, based on the common points and the initial color control method, includes:

When executing the initial color control method, after acquiring the color gradient line, record the length of the color gradient line as P, and record the value of P divided by k as the area retrieval value; and if the distance between any common point and the color gradient line is less than the area retrieval value, update the color gradient line to a curve fitted by the color gradient line and the common point.

In a second aspect, the present application also provides a linkage control system for TV viewing ambient light strips, including a controller installation module, a linkage initial control module, and a common light strip control module.

The controller installation module is configured to install the controller above the TV set and use the controller to acquire the color data of images displayed on the TV set. The controller includes a light strip controller, a photosensitive resistor, and a color sensor. It also acquires the dimensional data of the TV set and the positional relationship between the light strip and the TV set. The dimensional data of the TV set includes length, width, and height of each part of the TV set.

The linkage initial control module is configured to establish an initial color control method based on the dimensional data of the TV set and the color data of images displayed on the TV set acquired by the controller, and control the color of the light strip via the light strip controller using the initial color control method.

The common light strip control module is configured to acquire multiple controlled light strips obtained by the initial color control method based on multiple images displayed on the TV set, and record them as linkage analysis light strips respectively; perform feature extraction on the control data of the linkage analysis light strips, and obtain multiple common points in the color comparison chart of the initial color control method based on the feature extraction results;

and control the color of the light strip via the controller when the TV set is started, based on the common points and the initial color control method.

Beneficial effects of the present application: The present application first installs the controller above the TV set and uses the controller to acquire the color data of images displayed on the TV set; then establishes an initial color control method based on the dimensional data of the TV set and the color data of images displayed on the TV set acquired by the controller, and uses the initial color control method to control the color of the light strip via the light strip controller. The advantage of this lies in that, by establishing the initial color control method and using it to control the color of the light strip, each lamp bead in the light strip can be associated with the nearest image color in the TV set based on the color data corresponding to the image in the TV set. This enables obtaining the control direction for color control of each lamp bead in the light strip, and then the color required for controlling the lamp bead is acquired through the RGB color chart. This ensures that the color displayed by the lamp bead can fit the color of the edge image in the TV set, further making the gradient light source emitted by the entire light strip fit the color of the TV edge, reducing the sense of disconnection between the light strip and the images displayed on the TV set when the user uses the light strip, and improving the user's viewing immersion.

The present application also acquires the linkage analysis light strips obtained by the initial color control method based on multiple images displayed on the TV set; performs feature extraction on the control data of the linkage analysis light strips, and obtains multiple common points in the color comparison chart of the initial color control method based on the feature extraction results; and controls the color of the light strip via the controller when the TV set is started, based on the common points and the initial color control method. The advantage of this lies in that, by obtaining common points through feature extraction, it can acquire the colors that are frequently used when controlling the color of the lamp beads in the light strip, i.e., the colors more suitable for color gradient. This facilitates combining the colors corresponding to the common points with the original color control when executing the initial color control method, so as to realize more natural color changes of each lamp bead during the control of the lamp bead, further reducing the sense of disconnection in the images seen by the user and improving the user's viewing experience.

DETAILED DESCRIPTION

The technical solutions in the embodiments of the present application will be explicitly and completely described below with reference to the drawings in the embodiments of the present application. Obviously, the embodiments described are only a part of, not all, the embodiments of the present application. Based on the embodiments described herein, all other embodiments obtained by those of ordinary skill in the art without creative work are within the scope of the present application.

Figure 1:
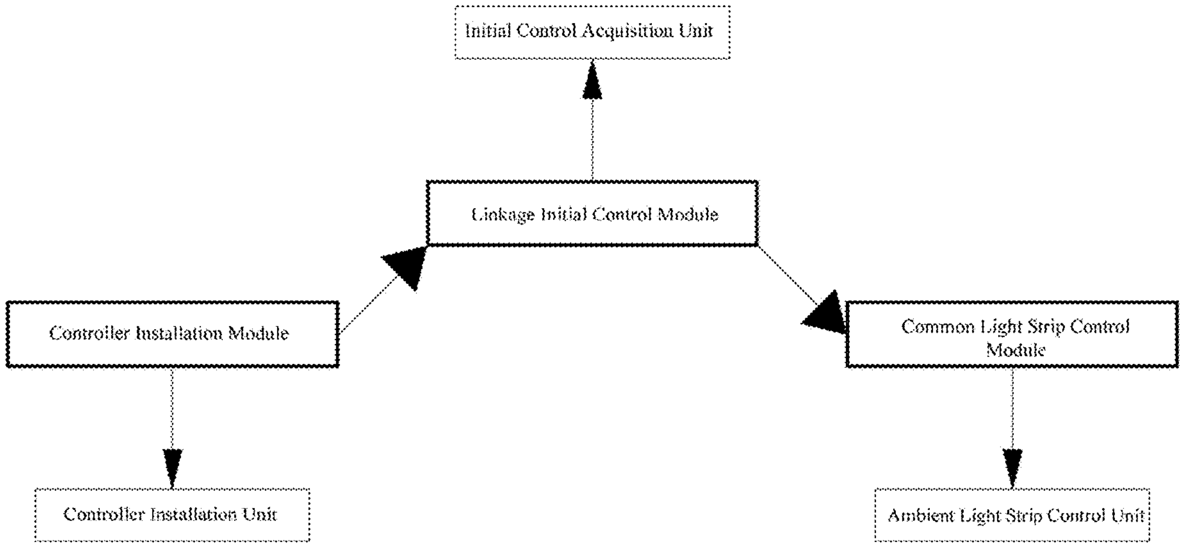
FIG. 1 is a principle block diagram of the system of the present application.
Figure 2:
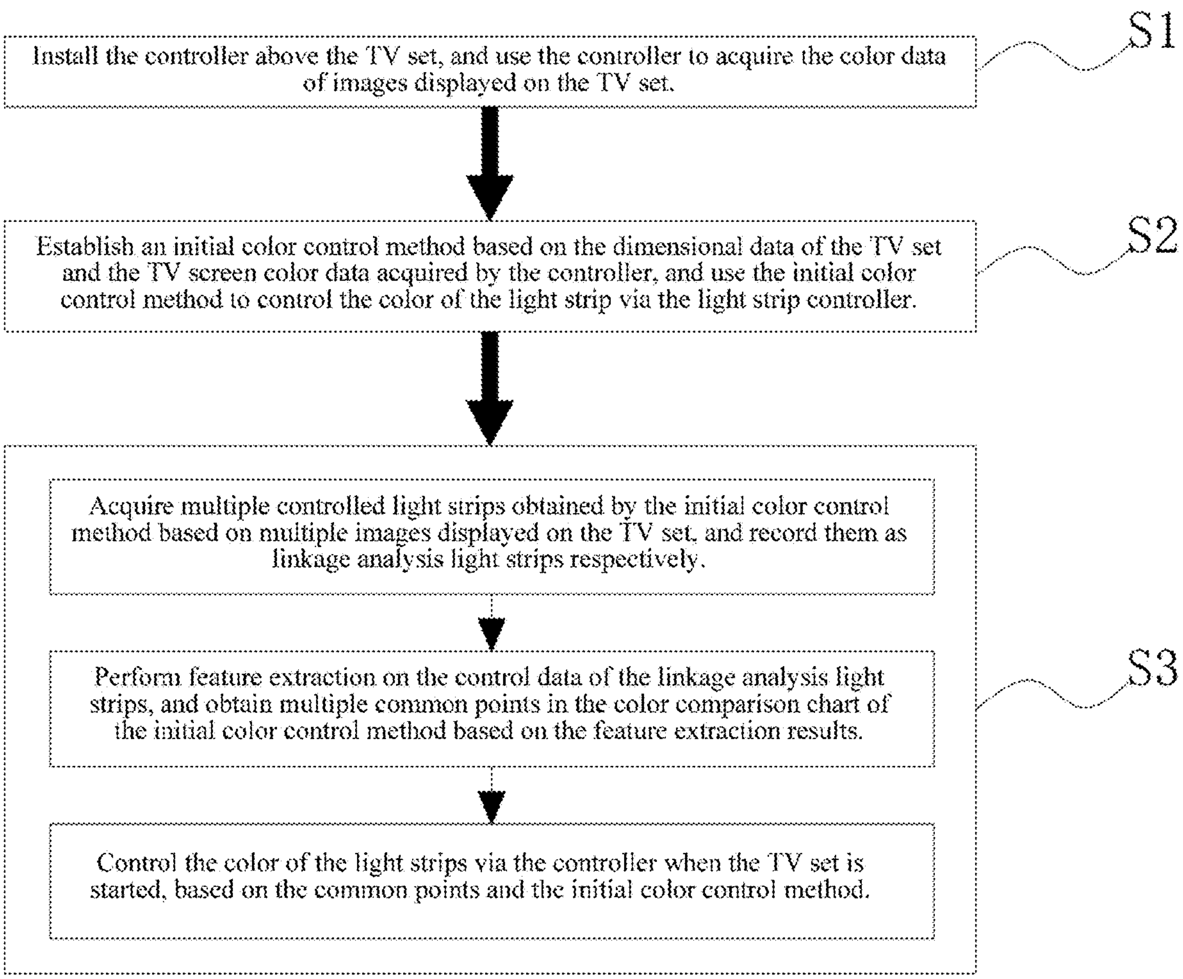
FIG. 2 is a flow chart of the steps of the method of the present application.

Embodiment 1: Referring to FIG. 1, the present application provides a linkage control system for TV viewing ambient light strips, including a controller installation module, a linkage initial control module, and a common light strip control module.

The controller installation module is configured to install the controller above the TV set and use the controller to acquire the color data of images displayed on the TV set. The controller includes a light strip controller, a photosensitive resistor, and a color sensor. It also acquires the dimensional data of the TV set and the positional relationship between the light strip and the TV set. The dimensional data of the TV set includes length, width, and height of each part of the TV set.

The controller installation module includes a controller installation unit, which is configured with a controller installation strategy. The controller installation strategy includes:

The color sensor is configured to collect the color of images displayed on the TV set, and the obtained data corresponding to the color distribution is recorded as color data of images displayed on the TV set. The photosensitive resistor is configured to monitor the ambient light intensity where the TV set is located in real time, and when the ambient light intensity is lower than Ω, the light strip controller is powered on.

In the specific implementation process, the value of Ω can be determined according to the parameters of the actually used ambient light strip. In this embodiment, the value of Ω is set to 30 lux.

The linkage initial control module is configured to establish an initial color control method based on the dimensional data of the TV set and the color data of images displayed on the TV set acquired by the controller, and control the color of the light strip via the light strip controller using the initial color control method.

The linkage initial control module includes an initial control acquisition unit, which is configured with an initial control acquisition strategy. The initial control acquisition strategy includes:

Establish a plane rectangular coordinate system, denoted as the light control analysis coordinate system, where the units of both the X-axis and Y-axis of the light control analysis coordinate system are m; place the front view of the TV set in the first quadrant of the light control analysis coordinate system in equal proportion based on the dimensional data of the TV set, and record it as the TV block diagram; and In this embodiment, it is assumed that the TV set and its light strip are in the same plane. That is, if the TV set is mounted on a wall, the light strip should be distributed on the same wall as the TV set. If the light strip is widely distributed such that some parts of the light strip cannot be in the same plane as the TV set, the light control analysis coordinate system can be changed to a spatial coordinate system to obtain the marked light strip in subsequent steps.

Mark the position of the light strip in the light control analysis coordinate system based on the positional relationship between the light strip and the TV set and the proportion of the TV set in the light control analysis coordinate system, and record it as the marked light strip.

Figure 3:
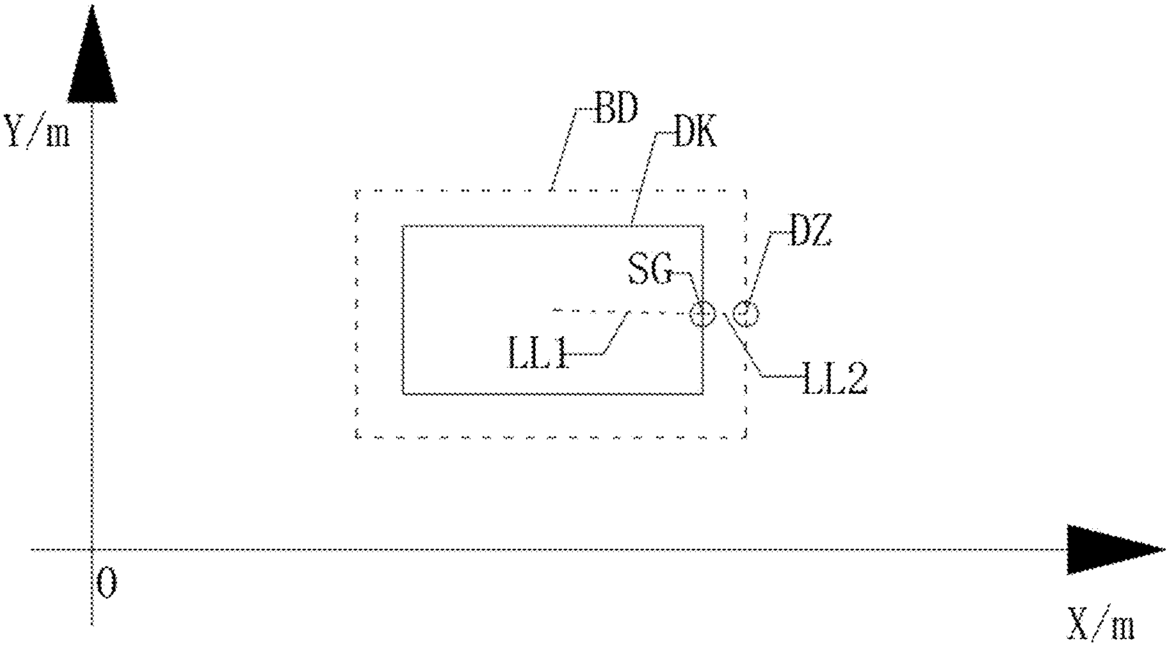
FIG. 3 is a schematic diagram of the light control analysis coordinate system of the present application.

Reduce the ambient light intensity where the TV set is located to less than Ω, randomly display an image on the TV set, acquire the color data of images displayed on the TV set at this time, and establish the initial color control method. The initial color control method includes:

Draw a color map corresponding to the image in the TV set within the TV block diagram based on the color data of images displayed on the TV set, and record it as the color block analysis diagram; for any lamp bead in the light strip: acquire the position corresponding to the lamp bead in the marked light strip, and record it as the marked point; acquire the point in the color block analysis diagram that is closest to the marked point, and record it as the color association point;

In the specific implementation process, for example, during one data analysis, the obtained light control analysis coordinate system is as shown in FIG. 3, where point DZ is the point corresponding to a lamp bead in the light strip, quadrilateral BD is the marked light strip, and quadrilateral DK is the TV block diagram. Through analysis, point SG is determined as the color association point, the length of the dashed line LL1 is 0.75 m, and the length of the dashed line LL2 is 0.2 m. Through calculation, the distance ratio is 0.267, so low-spacing filling can be adopted in subsequent analysis.

Acquire a full-color RGB comparison chart with white at the bottom-left corner and black at the top-right corner, and record it as the color comparison chart; acquire the point in the full-color RGB comparison chart that has the same RGB value as the color association point based on the RGB value of the color association point, and record it as the color chart response point; and record the line connecting the color chart response point and the bottom-left corner of the color comparison chart as the color gradient line.

In this embodiment, if one color comparison chart is acquired, the same color comparison chart is adopted for all lamp beads in the light strip when implementing the initial color control method, so as to control variables during data analysis.

Record the center point of the TV block diagram as the TV center point; record the distance between the TV center point and the color association point as L1, and the distance between the color association point and the marked point as L2; record the value of L2 divided by L1 as the distance ratio; when the distance ratio is less than or equal to 1, perform low-spacing filling; and when the distance ratio is greater than 1, perform high-spacing filling.

In the specific implementation process, the purpose of performing low-spacing filling or high-spacing filling based on the distance ratio is that if the distance ratio is less than or equal to 1, the lamp bead is relatively close to the the images displayed on the TV set, so simpler color changes with fewer color types should be adopted to control the lamp bead, thereby realizing rapid gradient control of the color in the TV set. This can be achieved by dividing the color gradient line into equal parts and sampling a small number of filling colors for color control, so as to realize a faster color gradient effect. If the distance ratio is greater than 1, the lamp bead is relatively far from the images displayed on the TV set, so a more comprehensive gradient effect should be adopted to improve the sense of image immersion, thereby filling the blank area between the lamp bead and the image. This can be achieved by acquiring all colors corresponding to the color gradient line for color control, so as to realize a slower and more comprehensive color gradient effect.

Low-spacing filling includes: dividing the color gradient line into k equal parts in proportion, and recording the midpoint of each part as a filling selection point, where k is the number of seconds of the color switching interval of the light strip; recording the color of each filling selection point in the color comparison chart as the filling color corresponding to the filling selection point;

Recording all filling selection points in sequence as filling selection points $TX_1$ to $TX_k$ based on their distance from the color chart response point from the nearest to the farthest; and within k seconds, adjusting the color of the lamp bead corresponding to the marked point to the filling colors of filling selection points $TX_1$ to $TX_k$ in sequence, and cycling repeatedly when the image on the TV set does not switch.

High-spacing filling includes:

Acquiring all points in the color comparison chart that correspond to colors overlapping with the color gradient line, and recording them all as high-filling points; recording the color of each high-filling point as the high-filling color corresponding to the high-filling point;

Recording all high-filling points in sequence as high-filling points $GT_1$ to $GT_j$ based on their distance from the color chart response point from the nearest to the farthest; within k seconds, adjusting the color of the lamp bead corresponding to the marked point to the high-filling colors of high-filling points $GT_1$ to $GT_j$ in sequence, and cycling repeatedly when the image on the TV set does not switch.

In the specific implementation process, for example, during one data analysis, k is 8 seconds and the number of high-filling points is 16. In this case, the lamp bead should be controlled to display the high-filling colors of high-filling points $GT_1$ to GT; in sequence within 8 seconds. To ensure uniform color distribution, each high-filling color corresponding to a high-filling point should be displayed on the lamp bead for 0.5 seconds.

The initial color control method also includes: acquiring the low-spacing filling or high-spacing filling corresponding to all lamp beads in the light strip, and controlling the color of each lamp bead based on the low-spacing filling or high-spacing filling corresponding to the lamp bead. Note that the color comparison chart for all lamp beads is the same.

The common light strip control module is configured to acquire multiple controlled light strips obtained by the initial color control method based on multiple images displayed on the TV set, and record them as linkage analysis light strips respectively; perform feature extraction on the control data of the linkage analysis light strips, and obtain multiple common points in the color comparison chart of the initial color control method based on the feature extraction results; and control the color of the light strip via the controller when the TV set is started, based on the common points and the initial color control method.

The common light strip control module includes an ambient light strip control unit, which is configured with an ambient light strip control strategy. The ambient light strip control strategy includes:

Record the number of acquired linkage analysis light strips as t; draw the color gradient lines corresponding to all lamp beads of all linkage analysis light strips in the same color block analysis diagram based on the control data of the linkage analysis light strips, and acquire gradient key points in the color block analysis diagram (a gradient key point is an intersection point of t or more color gradient lines in the color block analysis diagram);

For any lamp bead in the light strip: mark the high-filling points and filling selection points in the high-spacing filling or low-spacing filling corresponding to the lamp bead in the control data of all linkage analysis light strips within the same color block analysis diagram; if there is any point A marked as both a high-filling point and a filling selection point, record point A as a lamp bead key point; and In the specific implementation process, the purpose of acquiring lamp bead key points and gradient key points is to obtain the positions of colors that are frequently adopted in controlling all lamp beads, i.e., colors more suitable for controlling the color gradient of lamp beads. This allows combining the original color control with the colors corresponding to the common points when implementing the initial color control method, so as to realize more natural color changes when controlling each lamp bead, further reducing the user's sense of disconnection in visual experience and improving the user's viewing immersion.

Acquire the lamp bead key points corresponding to all lamp beads, and record the lamp bead key points and gradient key points as common points.

Figure 4:
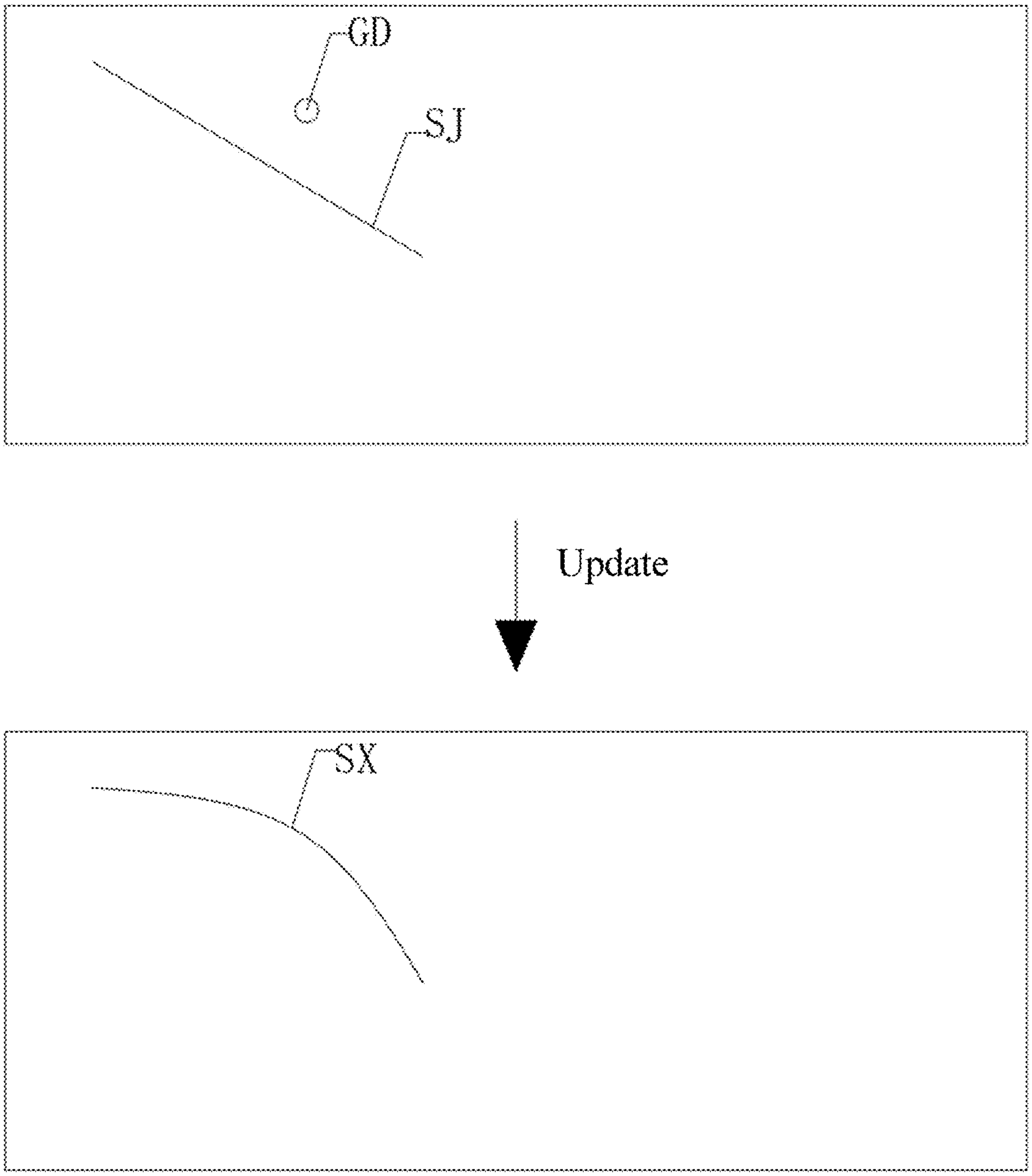
FIG. 4 is a schematic diagram of updating the color gradient line of the present application.

When executing the initial color control method, after acquiring the color gradient line, record the length of the color gradient line as P, and record the value of P divided by k as the area retrieval value. If the distance between any common point and the color gradient line is less than the area retrieval value, update the color gradient line to a curve fitted by the color gradient line and the common point. In the specific implementation process, for example, during one data analysis, the obtained color gradient line is as shown by SJ in FIG. 4, and the point whose distance from the color gradient line is less than the area retrieval value is point GD. In this case, the color gradient line can be updated to the curve SX, so as to realize more natural color changes of the lamp bead when controlling the lamp bead based on the color gradient line.

Figure 5:
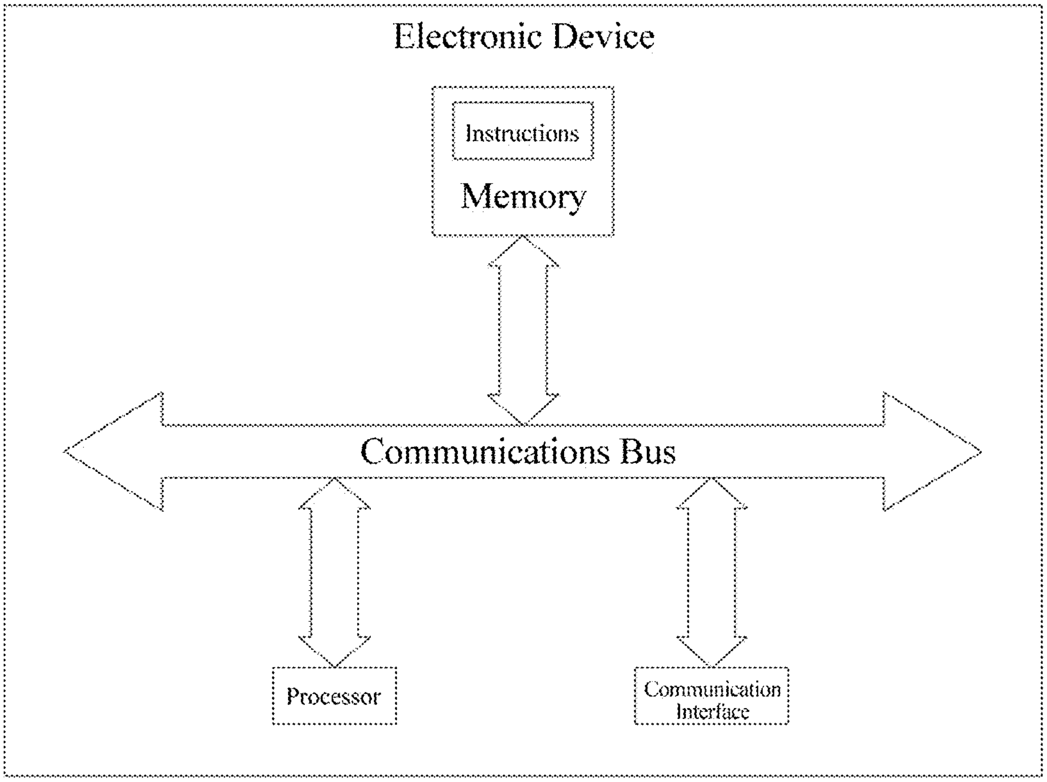
FIG. 5 is a structural schematic diagram of the electronic device of the present application.

Embodiment 2: Referring to FIG. 5, the present application also provides a linkage control method for TV viewing ambient light strips, including the following steps:

Step S1: Install a controller above the TV set and use the controller to acquire the color data of images displayed on the TV set. The controller includes a light strip controller, a photosensitive resistor, and a color sensor. It also acquires the dimensional data of the TV set and the positional relationship between the light strip and the TV set. The dimensional data of the TV set includes length, width, and height of each part of the TV set.

Step S1 includes: The color sensor is configured to collect the color of images displayed on the TV set, and the obtained data corresponding to the color distribution is recorded as color data of images displayed on the TV set. The photosensitive resistor is configured to monitor the ambient light intensity where the TV set is located in real time, and when the ambient light intensity is lower than Ω, the light strip controller is powered on.

Step S2: Establish an initial color control method based on the dimensional data of the TV set and the color data of images displayed on the TV set acquired by the controller, and use the initial color control method to control the color of the light strip via the light strip controller.

Step S2 includes: Step S201: Establish a plane rectangular coordinate system, denoted as the light control analysis coordinate system, where the units of both the X-axis and Y-axis of the light control analysis coordinate system are m. Place the front view of the TV set in the first quadrant of the light control analysis coordinate system in equal proportion based on the dimensional data of the TV set, and record it as the TV block diagram.

Step S202: Mark the position of the light strip in the light control analysis coordinate system based on the positional relationship between the light strip and the TV set and the proportion of the TV set in the light control analysis coordinate system, and record it as the marked light strip.

Step S203: Reduce the ambient light intensity where the TV set is located to less than Ω, randomly display an image on the TV set, acquire the color data of images displayed on the TV set at this time, and establish the initial color control method. The initial color control method includes:

Step S2031: Draw a color map corresponding to the image in the TV set within the TV block diagram based on color data of images displayed on the TV set, and record it as the color block analysis diagram. For any lamp bead in the light strip: acquire the position corresponding to the lamp bead in the marked light strip, and record it as the marked point. Acquire the point in the color block analysis diagram that is closest to the marked point, and record it as the color association point.

Step S2032: Acquire a full-color RGB comparison chart with white at the bottom-left corner and black at the top-right corner, and record it as the color comparison chart. Acquire the point in the full-color RGB comparison chart that has the same RGB value as the color association point based on the RGB value of the color association point, and record it as the color chart response point. Record the line connecting the color chart response point and the bottom-left corner of the color comparison chart as the color gradient line.

Step S2033: Record the center point of the TV block diagram as the TV center point. Record the distance between the TV center point and the color association point as L1, and the distance between the color association point and the marked point as L2. Record the value of L2 divided by L1 as the distance ratio. When the distance ratio is less than or equal to 1, perform low-spacing filling. When the distance ratio is greater than 1, perform high-spacing filling.

Step S2034: Low-spacing filling includes: dividing the color gradient line into k equal parts in proportion, and recording the midpoint of each part as a filling selection point, where k is the number of seconds of the color switching interval of the light strip; recording the color of each filling selection point in the color comparison chart as the filling color corresponding to the filling selection point;

Recording all filling selection points in sequence as filling selection points $TX_1$ to $TX_k$ based on their distance from the color chart response point from the nearest to the farthest; and within k seconds, adjusting the color of the lamp bead corresponding to the marked point to the filling colors of filling selection points $TX_1$ to $TX_k$ in sequence, and cycling repeatedly when the image on the TV set does not switch.

Step S2035: high-spacing filling includes:

Acquiring all points in the color comparison chart that correspond to colors overlapping with the color gradient line, and recording them all as high-filling points;

recording the color of each high-filling point as the high-filling color corresponding to the high-filling point;

Recording all high-filling points in sequence as high-filling points $GT_1$ to $GT_j$ based on their distance from the color chart response point from the nearest to the farthest; within k seconds, adjusting the color of the lamp bead corresponding to the marked point to the high-filling colors of high-filling points $GT_1$ to $GT_j$ in sequence, and cycling repeatedly when the image on the TV set does not switch.

The initial color control method also includes: Step S2036: acquiring the low-spacing filling or high-spacing filling corresponding to all lamp beads in the light strip, and controlling the color of each lamp bead based on the low-spacing filling or high-spacing filling corresponding to the lamp bead. Note that the color comparison chart for all lamp beads is the same.

Step S3: Acquire multiple controlled light strips obtained by the initial color control method based on multiple images displayed on the TV set, and record them as linkage analysis light strips respectively. Perform feature extraction on the control data of the linkage analysis light strips, and obtain multiple common points in the color comparison chart of the initial color control method based on the feature extraction results. Control the color of the light strips via the controller when the TV set is started, based on the common points and the initial color control method.

Performing feature extraction on the control data of the linkage analysis light strips includes: Step S301: Record the number of acquired linkage analysis light strips as t. Draw the color gradient lines corresponding to all lamp beads of all linkage analysis light strips in the same color block analysis diagram based on the control data of the linkage analysis light strips, and acquire gradient key points in the color block analysis diagram (a gradient key point is an intersection point of t or more color gradient lines in the color block analysis diagram).

Step S302: For any lamp bead in the light strip: mark the high-filling points and filling selection points in the high-spacing filling or low-spacing filling corresponding to the lamp bead in the control data of all linkage analysis light strips within the same color block analysis diagram. If there is any point A marked as both a high-filling point and a filling selection point, record point A as a lamp bead key point.

Step S303: Acquire the lamp bead key points corresponding to all lamp beads, and record the lamp bead key points and gradient key points as common points.

Step S304: When executing the initial color control method, after acquiring the color gradient line, record the length of the color gradient line as P, and record the value of P divided by k as the area retrieval value. If the distance between any common point and the color gradient line is less than the area retrieval value, update the color gradient line to a curve fitted by the color gradient line and the common point.

Embodiment 3: Referring to FIG. 5, FIG. 5 illustrates a structural schematic diagram of an electronic device. The electronic device may include: a processor, a communication interface, a memory, and a communication bus. The processor, the communication interface, and the memory communicate with each other through the communication bus. The memory stores computer-readable instructions, and the processor may call the instructions in the memory. When the computer-readable instructions are executed by the processor, the steps in the linkage control method for TV viewing ambient light strips are executed to realize the following functions: first, install the controller above the TV set and use the controller to acquire the color data of images displayed on the TV set; then, establish an initial color control method based on the dimensional data of the TV set and the color data of images displayed on the TV set acquired by the controller, and use the initial color control method to control the color of the light strip via the light strip controller; finally, acquire multiple controlled light strips obtained by the initial color control method based on multiple images displayed on the TV set, and record them as linkage analysis light strips respectively; perform feature extraction on the control data of the linkage analysis light strips, and obtain multiple common points in the color comparison chart of the initial color control method based on the feature extraction results; and control the color of the light strip via the controller when the TV set is started, based on the common points and the initial color control method.

In addition, the logic instruction in the preceding memory can be implemented in a form of a software functional unit, and when sold or used as an independent product, the logic instruction can be stored on a computer-readable storage medium. Based on such an understanding, the technical solution of the present application, in essence, or the part that contributes to the existing art, or the part of the technical solution, can be embodied in a form of a software product. The computer software product is stored on a storage medium and includes several instructions for enabling a computer device (which can be a personal computer, a server, or a network device, and the like.) to execute all or part of the steps of the method described in various embodiments of the present application. The aforementioned storage medium includes: a USB flash drive, a mobile hard disk, read-only memory (ROM), random access memory (RAM), a magnetic disk, an optical disk, or other medium capable of storing program code.

Embodiment 4: The present application also provides a computer-readable storage medium. The present application provides a storage medium on which a computer program is stored. When the computer program is executed by a processor, the steps in the linkage control method for TV viewing ambient light strips are executed to realize the following functions: first, install the controller above the TV set and use the controller to acquire the color data of images displayed on the TV set; then, establish an initial color control method based on the dimensional data of the TV set and the color data of images displayed on the TV set acquired by the controller, and use the initial color control method to control the color of the light strip via the light strip controller; finally, acquire multiple controlled light strips obtained by the initial color control method based on multiple images displayed on the TV set, and record them as linkage analysis light strips respectively; perform feature extraction on the control data of the linkage analysis light strips, and obtain multiple common points in the color comparison chart of the initial color control method based on the feature extraction results; and control the color of the light strip via the controller when the TV set is started, based on the common points and the initial color control method.

Through the description of the above implementation, the embodiments of the present application can be provided as methods, systems, or computer program products. Based on such understanding, the preceding technical solution, in essence, or the part that contributes to the existing art, can be embodied in a form of a software product. The computer software product can be stored on a computer-readable storage medium such as ROM/RAM, a magnetic disk, an optical disk, including several instructions for enabling a computer device (which can be a personal computer, a server, or a network device, and the like.) to execute the methods described in the embodiments or in certain parts of the embodiments.

In the embodiments provided in the present application, it should be understood that the disclosed system or method can be implemented in other ways. The above-described embodiments are merely illustrative. For example, the division of modules or units is only one logical functional partition, and other division methods can be adopted in actual implementations. For another example, multiple modules or units can be combined or integrated into another system, or certain features can be omitted or not executed. Another point is that the mutual coupling or direct coupling or communication connection shown or discussed can be through some communication interfaces, and indirect coupling or communication connection between systems, modules, or units can be electrical, mechanical, or implemented in other forms.

Finally, it should be noted that the above embodiments are only used to illustrate the technical solutions of the present application, and are not intended to limit them. Although the present application has been described in detail with reference to the aforementioned embodiments, those of ordinary skill in the art will appreciate that modifications can still be made to the technical solutions described in the aforementioned embodiments, or equivalents may be substituted for certain technical features. Such modifications or substitutions do not make the essence of the corresponding technical solutions depart from the spirit and scope of the technical solutions of the embodiments of the present application.

What is claimed is:

1. A linkage control method for TV viewing ambient light strips, comprising:

installing a controller above a TV set, using the controller to acquire the color data of images displayed on the TV set, wherein the controller comprises a light strip controller, a photosensitive resistor, and a color sensor; and acquiring the dimensional data of the TV set and the positional relationship between a light strip and the TV set, wherein the dimensional data of the TV set comprises length, width, and height of each part of the TV set;

establishing an initial color control method based on the dimensional data of the TV set and the color data of the images displayed on the TV set acquired by the controller, and using the initial color control method to control the color of the light strip via the light strip controller; and acquiring multiple controlled light strips obtained by the initial color control method based on multiple images displayed on the TV set, and recording the multiple controlled light strips as linkage analysis light strips respectively; performing feature extraction on the control data of the linkage analysis light strips, and obtaining multiple common points in the color comparison chart of the initial color control method based on the feature extraction results; and controlling the color of the light strips via the controller when the TV set is started, based on the common points and the initial color control method.

2. The linkage control method for TV viewing ambient light strips according to claim 1, wherein the installing a controller above a TV set, using the controller to acquire the color data of images displayed on the TV set comprises:

configuring the color sensor to collect the color of the images displayed on the TV set, recording the obtained data corresponding to the color distribution as color data of the images displayed on the TV set, configuring the photosensitive resistor to monitor the ambient light intensity where the TV set is located in real time, and powering on the light strip controller when the ambient light intensity is lower than Ω.

3. The linkage control method for TV viewing ambient light strips according to claim 2, wherein the establishing an initial color control method based on the dimensional data of the TV set and the color data of the images displayed on the TV set acquired by the controller comprises:

establishing a plane rectangular coordinate system, denoted as the light control analysis coordinate system, wherein the units of both the X-axis and Y-axis of the light control analysis coordinate system are m, placing the front view of the TV set in the first quadrant of the light control analysis coordinate system in equal proportion based on the dimensional data of the TV set, and recording the front view as the TV block diagram; and marking the position of the light strip in the light control analysis coordinate system based on the positional relationship between the light strip and the TV set and the proportion of the TV set in the light control analysis coordinate system, and recording the light strip as the marked light strip.

4. The linkage control method for TV viewing ambient light strips according to claim 3, wherein the initial color control method established by reducing the ambient light intensity where the TV set is located to less than Ω, randomly displaying an image on the TV set, and acquiring the TV color data at this time comprises:

drawing a color map corresponding to the image in the TV set within the TV block diagram based on the color data of images displayed on the TV set, and record the color map as a color block analysis diagram; for any lamp bead in the light strip, acquiring the position corresponding to the lamp bead in the marked light strip, and recording the position as a marked point; acquiring the point in the color block analysis diagram that is closest to the marked point, and recording the point as a color association point; and acquiring a full-color RGB comparison chart with white at the bottom-left corner and black at the top-right corner, and recording the full-color RGB comparison chart as a color comparison chart; acquiring the point in the full-color RGB comparison chart that has the same RGB value as the color association point based on the RGB value of the color association point, and recording the point as a color chart response point; and recording the line connecting the color chart response point and the bottom-left corner of the color comparison chart as a color gradient line.

5. The linkage control method for TV viewing ambient light strips according to claim 4, wherein the initial color control method further comprises:

recording the center point of the TV block diagram as a TV center point, recording the distance between the TV center point and the color association point as L1, recording the distance between the color association point and the marked point as L2, and recording the value of L2 divided by L1 as the distance ratio; performing low-spacing filling when the distance ratio is less than or equal to 1 and performing high-spacing filling when the distance ratio is greater than 1;

wherein the low-spacing filling comprises: dividing the color gradient line into k equal parts in proportion, and recording the midpoint of each part as a filling selection point, wherein k is the number of seconds of the color switching interval of the light strip; recording the color of each filling selection point in the color comparison chart as the filling color corresponding to the filling selection point;

recording all filling selection points in sequence as filling selection points TX1 to TXk based on their distance from the color chart response point from the nearest to the farthest; and within k seconds, adjusting the color of the lamp bead corresponding to the marked point to the filling colors of filling selection points TX1 to TXk in sequence, and cycling repeatedly when the image on the TV set does not switch.

6. The linkage control method for TV viewing ambient light strips according to claim 5, wherein the high-spacing filling comprises:

acquiring all points in the color comparison chart that correspond to colors overlapping with the color gradient line, and recording the points all as high-filling points; recording the color of each high-filling point as the high-filling color corresponding to the high-filling point;

recording all high-filling points in sequence as high-filling points GT1 to GTj based on their distance from the color chart response point from the nearest to the farthest; within k seconds, adjusting the color of the lamp bead corresponding to the marked point to the high-filling colors of high-filling points GT1 to GTj in sequence, and cycling repeatedly when the image on the TV set does not switch.

7. The linkage control method for TV viewing ambient light strips according to claim 6, wherein the initial color control method further comprises:

acquiring the low-spacing filling or high-spacing filling corresponding to all lamp beads in the light strip, and controlling the color of each lamp bead based on the low-spacing filling or high-spacing filling corresponding to the lamp bead, wherein the color comparison chart for all lamp beads is the same.

8. The linkage control method for TV viewing ambient light strips according to claim 7, wherein the steps of performing feature extraction on the control data of the linkage analysis light strips comprise:

recording the number of acquired linkage analysis light strips as t; drawing the color gradient lines corresponding to all lamp beads of all linkage analysis light strips in the same color block analysis diagram based on the control data of the linkage analysis light strips, and acquiring gradient key points in the color block analysis diagram, wherein a gradient key point is an intersection point of t or more color gradient lines in the color block analysis diagram;

for any lamp bead in the light strip: marking the high-filling points and filling selection points in the high-spacing filling or low-spacing filling corresponding to the lamp bead in the control data of all linkage analysis light strips within the same color block analysis diagram; recording point A as a lamp bead key point if there is any point A marked as both a high-filling point and a filling selection point; and acquiring the lamp bead key points corresponding to all lamp beads, and recording the lamp bead key points and gradient key points as common points.

9. The linkage control method for TV viewing ambient light strips according to claim 8, wherein the controlling the color of the light strips via the controller when the TV set is started, based on the common points and the initial color control method comprises:

recording the length of the color gradient line as P after acquiring the color gradient line when executing the initial color control method, and recording the value of P divided by k as the area retrieval value; and updating the color gradient line to a curve fitted by the color gradient line and the common point if the distance between any common point and the color gradient line is less than the area retrieval value.

10. A linkage control system for TV viewing ambient light strips, configured to implement the linkage control method for TV viewing ambient light strips according to claim 1, comprising a controller installation module, a linkage initial control module, and a common light strip control module; wherein the controller installation module is configured to install a controller above the TV set and the controller is used to acquire the color data of images displayed on a TV set, wherein the controller comprises a light strip controller, a photosensitive resistor, and a color sensor, and to acquire the dimensional data of the TV set and the positional relationship between the light strip and the TV set, wherein the dimensional data of the TV set comprises length, width, and height of each part of the TV set;

the linkage initial control module is configured to establish an initial color control method based on the dimensional data of the TV set and the color data of images displayed on the TV set acquired by the controller, wherein the initial color control method is used to control the color of the light strip via the light strip controller; and the common light strip control module is configured to acquire multiple controlled light strips obtained by the initial color control method based on multiple images displayed on the TV set, wherein the controlled light strips are recorded as linkage analysis light strips respectively, wherein feature extraction is performed on the control data of the linkage analysis light strips, multiple common points in the color comparison chart of the initial color control method are obtained based on the feature extraction results, and the color of the light strip is controlled via the controller when the TV set is started, based on the common points and the initial color control method.

* * * * *